United States Patent [19]

Tanaka

[11] Patent Number: 6,088,124
[45] Date of Patent: Jul. 11, 2000

[54] COLOR IMAGE PROCESSING APPARATUS AND METHOD

[75] Inventor: Fumihiro Tanaka, Yono, Japan

[73] Assignee: Canon Kabushiki Kaisha, Tokyo, Japan

[21] Appl. No.: 09/004,515

[22] Filed: Jan. 8, 1998

Related U.S. Application Data

[63] Continuation of application No. 08/422,958, Apr. 17, 1995.

[51] Int. Cl.$^7$ ........................................................ G06K 9/00
[52] U.S. Cl. .......................................... 358/1.9; 382/161
[58] Field of Search ........................ 358/539, 426–427, 358/430–431, 433, 1.9; 382/161, 166; 395/109

[56] References Cited

U.S. PATENT DOCUMENTS

| | | | |
|---|---|---|---|
| 4,783,841 | 11/1988 | Crayson | 358/426 |
| 4,963,898 | 10/1990 | Kadowaki et al. | 346/157 |
| 5,249,053 | 9/1993 | Jain | 348/231 |
| 5,253,077 | 10/1993 | Hasegawa et al. | 358/404 |
| 5,544,286 | 8/1996 | Laney | 358/426 |

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

A color image recording apparatus capable of reducing a memory area for storing input image data by storing the image data after converting them into indexes with a bit length shorter than that of the image data. It is decided whether or not color information just read has already been registered in a color information holding area, and if not, the color information is registered. Subsequently, it is decided whether the number of registrations of the color information exceeds an upper limit of registration, and if it exceeds, an error processing is carried out. In this case, neither the storing nor the drawing of the image data is performed. If the number does not exceed, an index attached to the color information data at the registration is stored in an image data holding area as pixel data of the image data.

5 Claims, 12 Drawing Sheets

MULTI-LEVEL INPUT IMAGE DATA

| R=255 G=0 B=0 | R=128 G=255 B=128 | R=0 G=255 B=128 | R=128 G=255 B=128 |
|---|---|---|---|
| R=128 G=255 B=128 | R=255 G=255 B=255 | R=255 G=0 B=0 | R=255 G=255 B=255 |
| R=0 G=255 B=128 | R=255 G=0 B=0 | R=255 G=255 B=255 | R=255 G=0 B=0 |
| R=255 G=0 B=0 | R=128 G=255 B=128 | R=0 G=255 B=128 | R=0 G=255 B=128 |

*FIG. 4*

COLOR IMAGE PROCESSING APPARATUS AND METHOD

This application is a continuation of Ser. No. 08/422,958 filed Apr. 17, 1995.

BACKGROUND OF THE INVENTION

1. Field of the Invention

The present invention relates to a color image processing apparatus and method.

2. Description of Related Art

Conventionally, color image recording apparatuses are known which temporarily store multi-level input image data into an inner memory, and generate, when receiving a paper outlet command or the like, binary patterns for respective colors such as YMCK (Yellow, Magenta, Cyan, and Black) inks, with which the apparatuses are provided, thereby recording the input image data. The conventional apparatuses require a sufficient amount of memory capacity for storing the multi-level input image data.

The conventional color image recording apparatuses, however, cannot temporarily store the input image data into the memory if the input image data exceeds the memory capacity of the apparatuses. This presents a problem in that correct recording cannot be achieved.

SUMMARY OF THE INVENTION

Therefore a first object of the present invention is to provide a color image processing apparatus which reduces the capacity of a memory for temporarily storing the input image data, and a color image recording apparatus including the same.

A second object of the present invention is to provide a color image processing apparatus which further reduces the capacity of the memory for temporarily storing the input image data by carrying out processing after converting the input image data represented by RGB (Red, Green, and Blue) into image data represented by YMCK (Yellow, Magenta, Cyan, and Black), and to provide a color image recording apparatus including the color image processing apparatus.

A third object of the present invention is to provide a color image processing apparatus which makes drawings, in a short time, of a small size input image whose data amount is less than the inner memory capacity, by storing the image data without carrying out the image conversion, and to provide a color image recording apparatus including the color image processing apparatus.

In a first aspect of the present invention, there is provided a color image processing apparatus comprising:

storing means for storing color information of an input pixel together with an index representing the color information;

decision means for making a decision whether or not the color information has already been stored in the storing means;

registering means for registering the color information of the input pixel together with its corresponding index to the storing means, when the decision means makes a decision that the color information has not yet been stored in the storing means; and converting means for converting the color information into the index corresponding to the color information.

Here, the color image processing apparatus may further comprise a color system converting means for converting a first color system of the color information into a second color system before converting the color information into the index by the converting means.

The color system converting means may convert the first color system into a third color system used in outputting an image at an image output portion.

The color image processing apparatus may further comprise a color image storing means for storing a plurality of indexes representing a color image, and the correspondence between the color information and the indexes, the correspondence being used in converting the color image into the plurality of indexes.

The second color system may be spanned by yellow, cyan, magenta, and black.

The index may have a predetermined fixed bit length.

The index may have a variable bit length determined in accordance with the number of different pieces of the color information.

In a second aspect of the present invention, there is provided a color image processing apparatus comprising:

storing means for storing image data;

decision means for making a decision whether or not input image data can be accommodated in the storing means; and first writing means for writing, if the decision is made by the decision means that the input image data cannot be accommodated in the storing means, an index which is obtained by converting color information of each pixel of the input image data into the storing means.

Here, the color image processing apparatus may further comprise second writing means for writing, if a decision is made by the decision means that the input image data can be accommodated in the storing means, the input image data into the storing means without change.

The decision means may make a decision by comparing a size of the input image data with a vacant area size of the storing means.

In a third aspect of the present invention, there is provided a color image processing apparatus comprising:

input means for inputting image information expressed by a PDL (Picture Description Language);

converting means for converting the image information into an index on the basis of a table indicating correspondence between the index and the image information.

Here, the color image processing apparatus may further comprise:

developing means for developing the PDL and obtaining color image data composed of a plurality of color components, wherein the image information consists of color image data.

The color image processing apparatus may further comprise:

storing means for storing the index, wherein the storing means sequentially stores indexes corresponding to a plurality of pieces of the PDL based on an identical document.

The storing means may store the indexes on a memory by overwriting the indexes in accordance with an order of the input PDL.

The table may be updated in accordance with the input image data.

In a fourth aspect of the present invention, there is provided a color image processing method comprising the steps of:

storing color information of an input pixel together with an index representing the color information;

making a decision whether or not the color information has already been stored in the storing means;

registering the color information of the input pixel together with its corresponding index to the storing means, when the decision means makes a decision that the color information has not yet been stored in the storing means; and converting the color information into the index corresponding to the color information.

In a fifth aspect of the present invention, there is provided a color image processing method comprising the steps of:

storing image data;

making a decision whether or not input image data can be accommodated in the storing means; and writing, if a decision is made by the decision means that the input image data cannot be accommodated in the storing means, an index which is obtained by converting color information of each pixel of the input image data into the storing means.

In a sixth aspect of the present invention, there is provided a color image processing method comprising the steps of:

inputting image data expressed by a PDL (Picture Description Language);

converting the image data into an index on the basis of a table indicating correspondence between the index and the image data; and developing the image data expressed by the PDL on the basis of the index.

According to the present invention, since the input image data are temporarily stored in the form of indexes with a bit length shorter than that of the input image data when necessary, the memory capacity for holding the input image data is reduced. In other words, the multi-color image data can be stored in a vacant lower capacity memory.

Furthermore, when the input image data are represented by an RGB color system, the memory capacity for storing the input image data is further reduced by storing the image data after converting the data into a YMCK color system, followed by a predetermined processing.

Moreover, since the input image data of a size less than the available memory capacity is stored without the image conversion, the data can be drawn in a shorter processing time.

The above and other objects, effects, features and advantages of the present invention will become more apparent from the following description of the embodiments thereof taken in conjunction with the accompanying drawings.

BRIEF DESCRIPTION OF THE DRAWINGS

FIG. 4 is a schematic diagram of an example of a multi-level color image data;

DETAILED DESCRIPTION OF PREFERRED EMBODIMENTS

The invention is described below reference to the accompanying drawings.

EMBODIMENT 1

Figure 1:
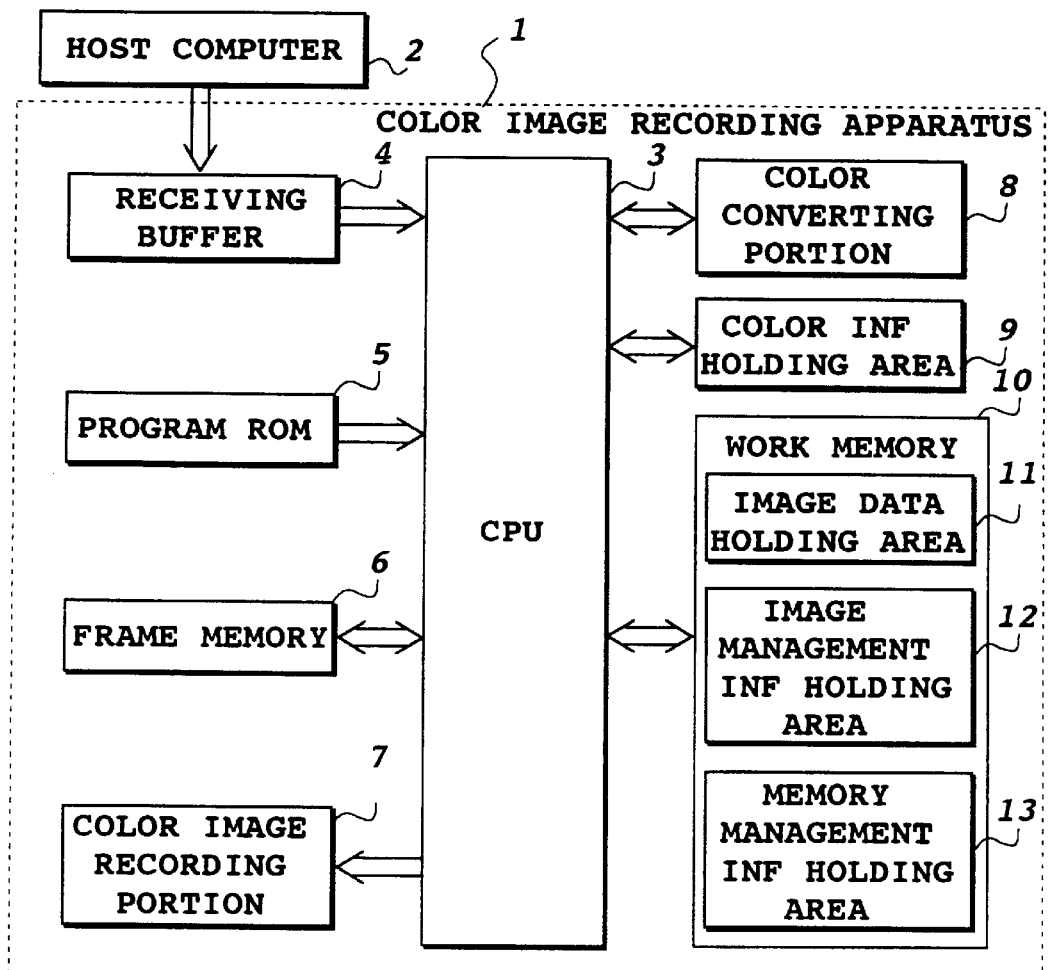
FIG. 1 is a block diagram showing a first embodiment of a color image recording apparatus in accordance with the present invention.

FIG. 1 is a block diagram of a color image recording apparatus to which the present invention is applied. In this figure, the reference numeral 1 designates a color image recording apparatus of the present embodiment, which receives multi-level color image data from a host computer 2, generates four binary image patterns, each for yellow (Y), magenta (M), cyan (C), and black (B), and records an image by superposing the four patterns on a recording sheet.

The color image data to be processed by the color image recording apparatus of the present embodiment are expressed by PDL (Page Description Language). Accordingly, it is assumed that the color image data include text data, graphic data, commands for ordering image drawing or the like, commands for designating colors, and data following these commands. In addition, it is assumed that the color designation is achieved for individual characters and figures, and that the color designation is given by RGB data.

The reference numeral 2 designates a host computer which provides color image data to the color image recording apparatus of this embodiment.

The reference numeral 3 designates a CPU for controlling the image recording apparatus in accordance with a program stored in a program ROM 5. Specifically, the CPU 3 performs analysis of the input PDL, expansion of the image data into a frame memory, or the like.

Figure 2:
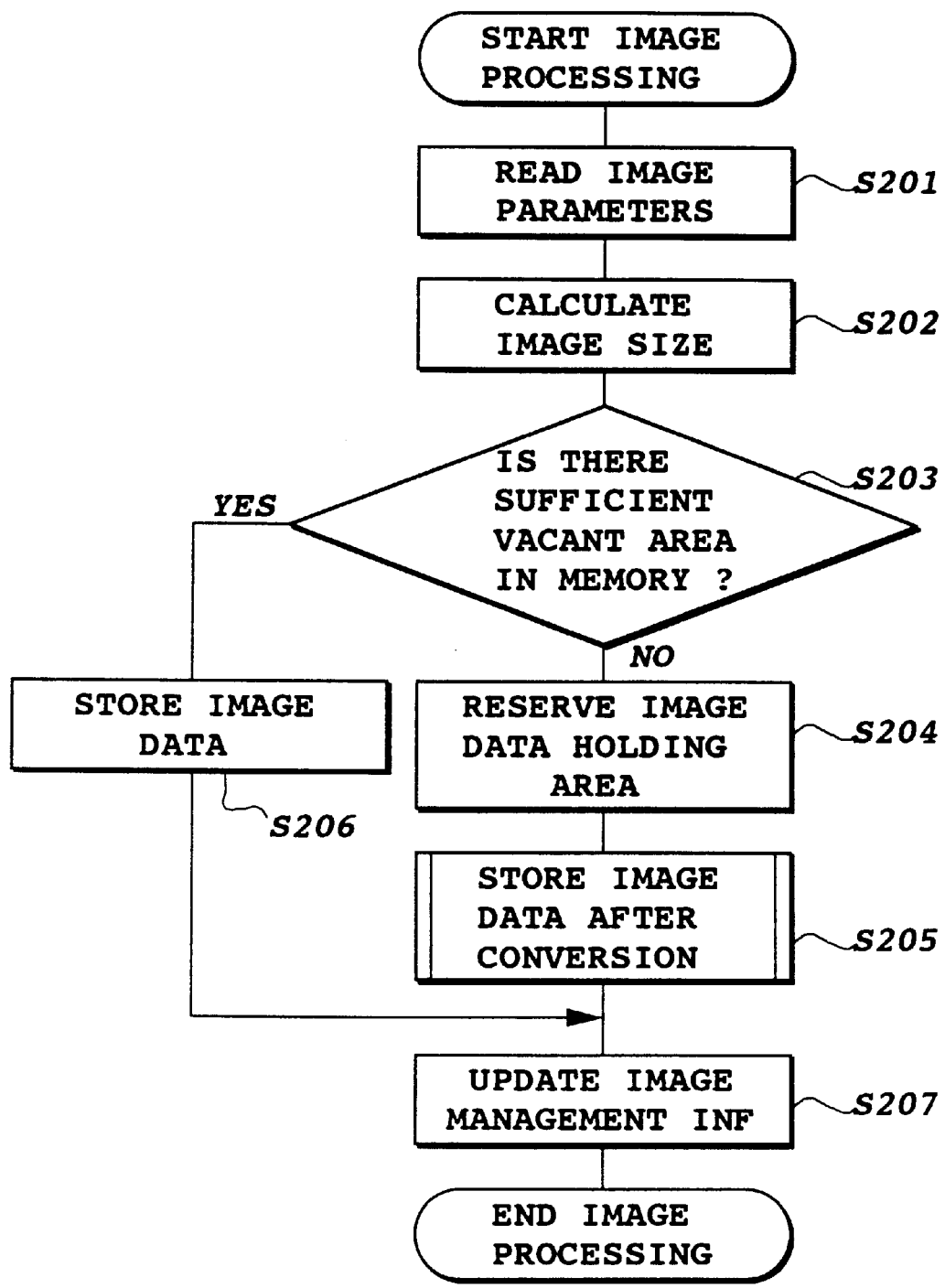
FIG. 2 is a flowchart of image processings executed by the CPU 3 of FIG. 1.

The reference numeral 4 designates a receiving buffer for temporarily storing the color image data sent from the host computer 2. The reference numeral 5 designates the program ROM that stores the program used by the CPU 3 for controlling the color image recording apparatus. The algorithm of the program is shown in FIG. 2.

The reference numeral 6 designates a frame memory that stores binary image patterns which are sequentially generated and developed for respective image data for Y, M, C, and K colors, each, and are overwritten sequentially in accordance with the order of the input PDL.

The reference numeral 7 designates a color image recording portion that records an image in accordance with the Y, M, C and K binary image patterns in the frame memory 6.

The reference numeral 8 designates a color converting portion for sequentially converting image data indicated by the indexes into binary data in the form of YMCK, that is, the ink colors of the color image recording apparatus.

The reference numeral 9 is a color information holding area, a table for storing color information of individual pixels in correspondence with 16-bit indexes 0–65536, the color information being represented in multi-level RGB colors.

The reference numeral 10 designates a work memory used by the color image recording apparatus 1 as a memory area when various image recordings are carried out.

The reference numeral 11 designates an image data holding area, in which second image data obtained by converting the input image data are temporarily stored. This area is located in the work memory 10, and is reserved for each input image data. Accordingly, the same number of image data holding areas are reserved as that of the input image data when a plurality of image data are present on one page. Here, the image data refers to the data of individual images included in a color image.

The reference numeral 12 designates an image management information holding area for storing information that indicates the number of image data in the image data holding area 11.

The reference numeral 13 designates a memory management information holding area for holding the size of the unused area, that is, the capacity of vacant memory area, and the top address thereof.

Next, the image data processing in this embodiment with the above-described arrangement is explained with reference to FIGS. 2–5.

FIG. 2 is a flowchart of the image input processing of this embodiment of the color image recording apparatus. It is assumed that a multi-level color image input to the color image recording apparatus consists of RGB dot sequential image data representing each pixel by 24 bit data consisting of three 8-bit data associated with RGB.

At step S201 in FIG. 2, the CPU 3 reads from the receiving buffer 4 parameters accompanying an image command. The read parameters are the numbers of pixels in the horizontal and vertical direction of the image data, and the position data on a printing area of the image. These parameters are stored in a vacant area in the work memory 12.

Next, at step S202, the CPU 3 calculates the total byte number of the image data from the parameters associated with the number of pixels of the image data read at step S201. The total byte number is obtained by the following equation:

total byte number=the number of pixels in the width direction×the number of pixels in the height direction×3

At step S203, the CPU 3 makes a decision whether an area for storing the image data in a 24-bit multi-level RGB form can be reserved in the work memory 10. This is performed by comparing the image data size calculated at step S202 with the capacity of the vacant area in the work area, which capacity is stored in the memory management information holding area 13. If the decision is negative, the CPU 3 proceeds to step S204 and the following steps, and performs an image conversion processing. In this embodiment, each pixel of the image data is converted into a 16-bit index. It should be noted that each pixel of the image data is represented by 24-bit data.

At step S204, the CPU 3 reserves the image data holding area 11 in the work memory 10. The size of the reserved area is expressed by the following equation taking account of the fact that the 24-bit (3 byte) pixel data is converted into 16-bit (2 byte) data.

total byte number=the number of pixels in the width direction×the number of pixels in the height direction×2

The CPU 3 immediately clears the memory management information after reserving the image data holding area 11.

At step S205, the CPU 3 reads the image data pixel by pixel from the receiving buffer 4 and performs conversion processing. The contents of the processing is described later with reference to FIG. 3.

After the conversion of the image data and the storing of the resultant data at step S205, the CPU 3 updates the image management information at step S207. That is, since the image data held in the image data holding area 11 is increased by one, the image management information records the data.

On the other hand, if the CPU 3 detects that a memory area for storing the image data is present in the work memory 10 at step S203, the CPU 3 stores the input image data into the work memory 10 at step S206 without changing the data, followed by a one step increment of the image management information at step S207. Thus, the input processing of the image data is completed.

The image data stored in the work memory 10 are sequentially read when a paper outlet command is issued, converted into binary image data, and are recorded. A description of the image drawing processing during this process is omitted.

Figure 3:
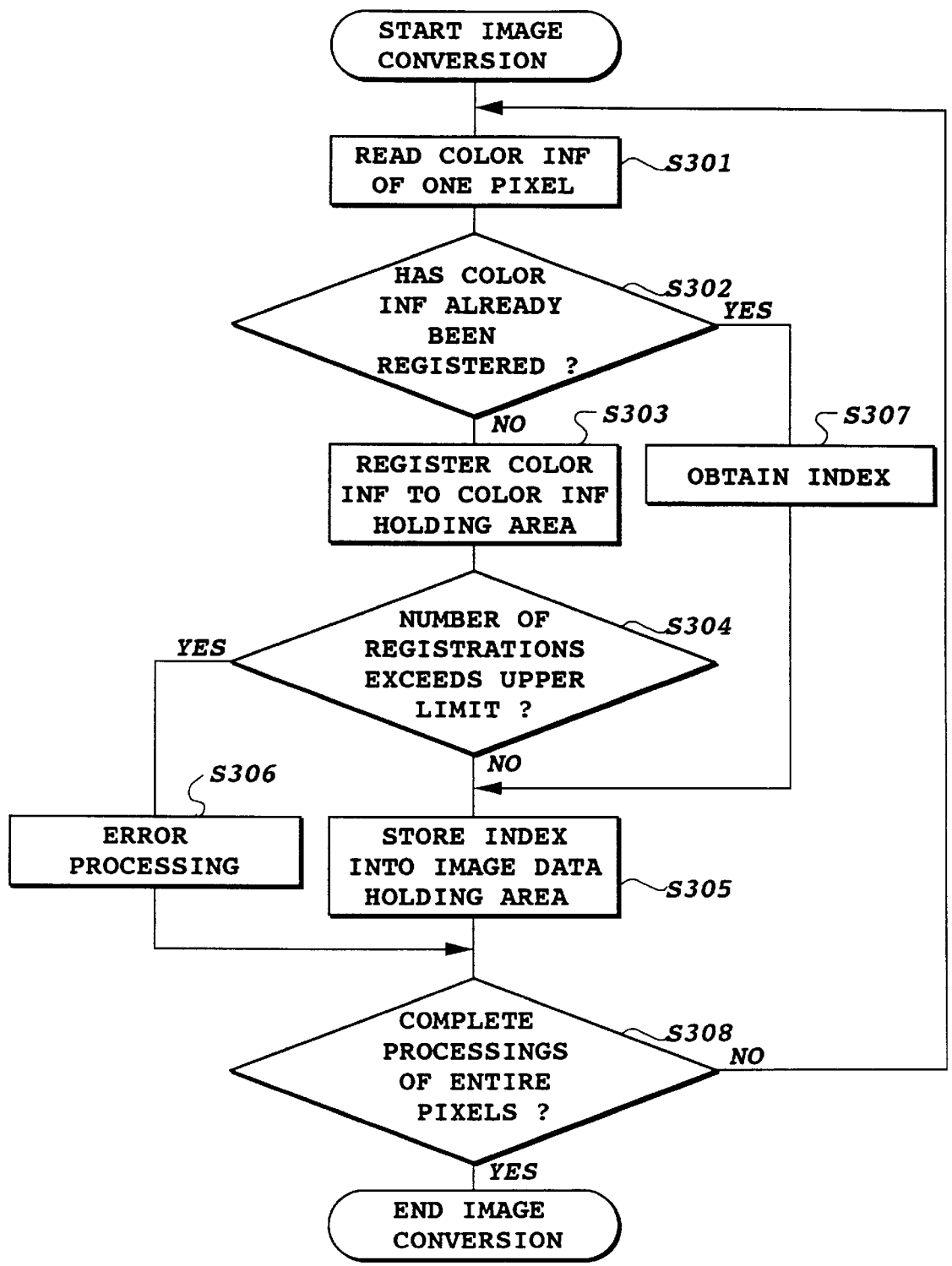
FIG. 3 is a flowchart of image conversion and storing processing during the image processing executed by the CPU 3 of FIG. 1.

FIG. 3 is a flowchart of the processing of step S205 in FIG. 2. In FIG. 3, the CPU 3 reads the input image data (see, FIG. 4) from the receiving buffer 4 pixel by pixel (each 3 bytes), converts the data into indexes (each 2 bytes), and stores the converted output data into the image data holding area 11.

Figure 5:
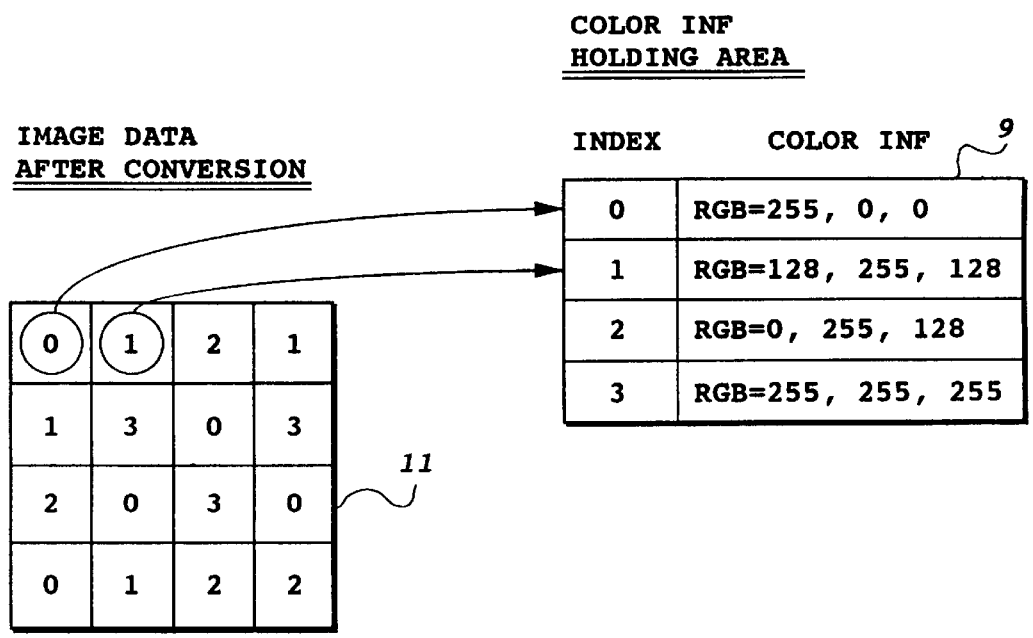
FIG. 5 is a diagram showing results of the image conversion of the multi-level color image as shown in FIG. 4, which is carried out in accordance with the method as shown in FIG. 3.

First, at step S301, the CPU 3 reads one pixel of image data from the receiving buffer 4. At step S302, the CPU 3 makes a decision whether or not the color information of the read data has already been registered in the color information holding area 9. If it has not yet been registered, the CPU 3 registers the color information into the color information holding area 9 at step S303. At step S304, the CPU makes a decision whether or not the number of registrations exceeds a predetermined upper limit. In this embodiment, the upper limit is determined an 65536 which indicates the number of colors that can be registered in the color information holding area 9. If the number of registration exceeds the upper limit, the CPU 3 proceeds to step S306 and performs an error processing. Accordingly, the image data is not stored and the image drawing is not carried out in this case. Conversely, if it is decided that the number of registration does not exceed the upper limit at step S304, the index associated with the color information is stored into the image data holding area 11 at step S305, as the pixel data of the image, as shown in FIG. 5.

If the CPU 3 decides that the color information has already been registered in the color information holding area 9 at step S302, the CPU 3 obtains the index corresponding to the color information, and stores the index into the image data holding area 11 at step S305. In this case, the color information is not registered into the color information holding area 9.

After storing the index into the image data holding area 11, the CPU 3 makes a decision whether or not all of the pixels have been processed at step S308, and repeats the above-described processing until all the pixels have been processed.

According to the present embodiment, when no vacant area is found in the work memory 10 for storing whole input image data in the form of the multi-value RGB data, the indexes obtained by converting the image data are stored into the image data holding area 11. Since the length of the image data of one pixel is 3 bytes and that of the index is 2 bytes, the memory area for storing the indexes can be reduced to ⅔ as compared with that for storing the image data before the conversion. This makes it possible to reserve the memory area for storing data, and to draw the image data.

In addition, since all the colors in the image data are converted into their own proper indexes, no color information is lost, which makes it possible to maintain a high quality image.

Furthermore, since the image data are stored without change when a vacant area is reserved, high speed processing is achieved. On the other hand, if no vacant area is available, the image data are stored after converting the data into indexes, which makes it possible to store the image data in a smaller area at the cost of the processing time.

Thus, this embodiment handles the image data in a manner more appropriate to the memory capacity than the conventional system.

Furthermore, although the present embodiment carries out image recording of respective image data of a single image stored in the work memory 10 on the basis of the correspondence between the indexes and the color information stored in the color information holding area 9, the correspondence between the respective image data, the indexes, and the color information may be stored, for example, in an external memory.

EMBODIMENT 2

The above-described first embodiment makes a decision, before temporarily storing the input multi-level color image data into a memory, whether or not a vacant area for storing the image data is available by comparing the vacant area capacity of the memory with the size of the image data, and if a vacant area is not available, the color information of each pixel in the form of RGB is registered in the color information holding area 9 together with the index, thereby converting the image data.

Figure 9:
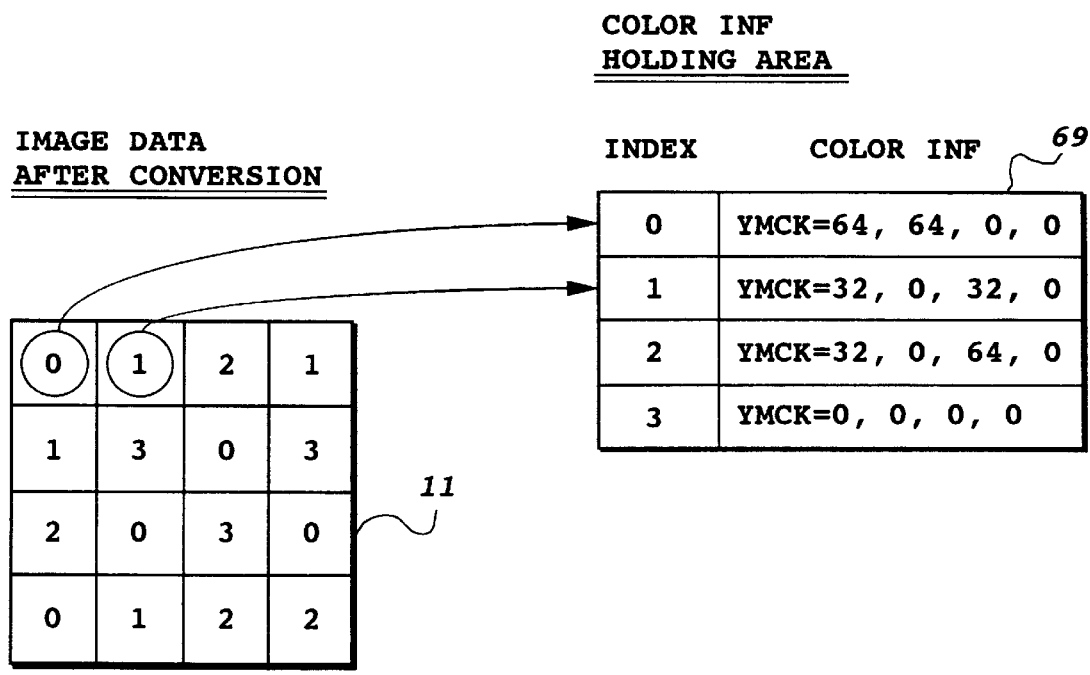
FIG. 9 is a diagram showing results of the image conversion of the multi-level color image as shown in FIG. 4, which is carried out in accordance with the method as shown in FIG. 8.

In the second embodiment described below, the RGB color information of each pixel of the input image data is not registered in the color information holding area, but is converted into ink colors YMCK of the color image recording apparatus. The values of each YMCK are registered into a color information holding area 69 with the index as shown in FIG. 9, and the image data are converted by using the values. This will is described in more detail below.

Figure 6:
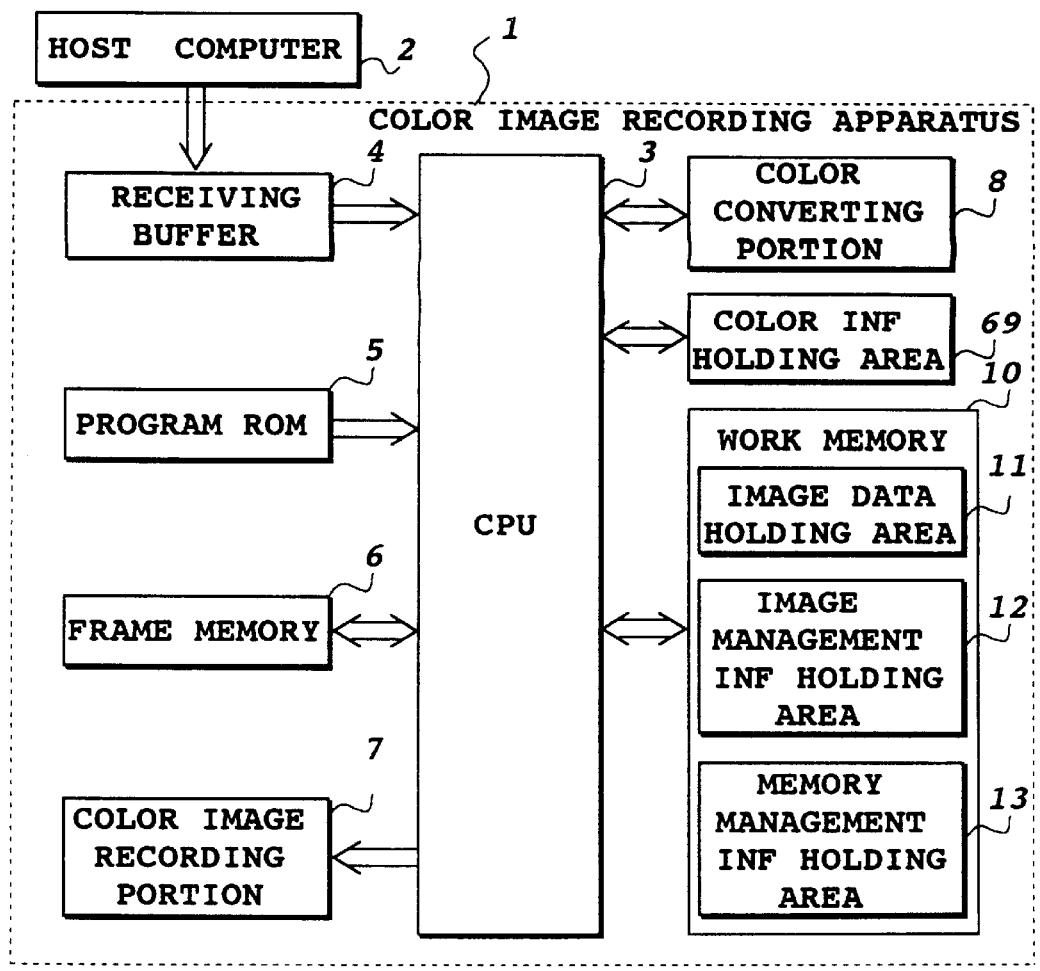
FIG. 6 is a block diagram of a second embodiment of a color image recording apparatus in accordance with the present invention.

FIG. 6 is a block diagram of an embodiment of a color image recording apparatus in accordance with the present invention. Since the color image recording apparatus shown in FIG. 6 is similar to that in FIG. 1, like portions are designated by the same reference numerals, and the description thereof is omitted. The apparatus of FIG. 6 differs from that of FIG. 1 in that the color information holding area 69 stores the respective values of YMCK of each pixel of the image data rather than the values of RGB of the pixel.

In addition, it is assumed that the present embodiment converts the multi-level RGB values into 64 (6-bit) gray levels for each of YMCK colors, followed by the drawing. In other words, the total of 24-bit (8 bits×3) RGB values per pixel is converted into the total of 24-bit (6 bits×4) YMCK values per pixel.

Figure 7:
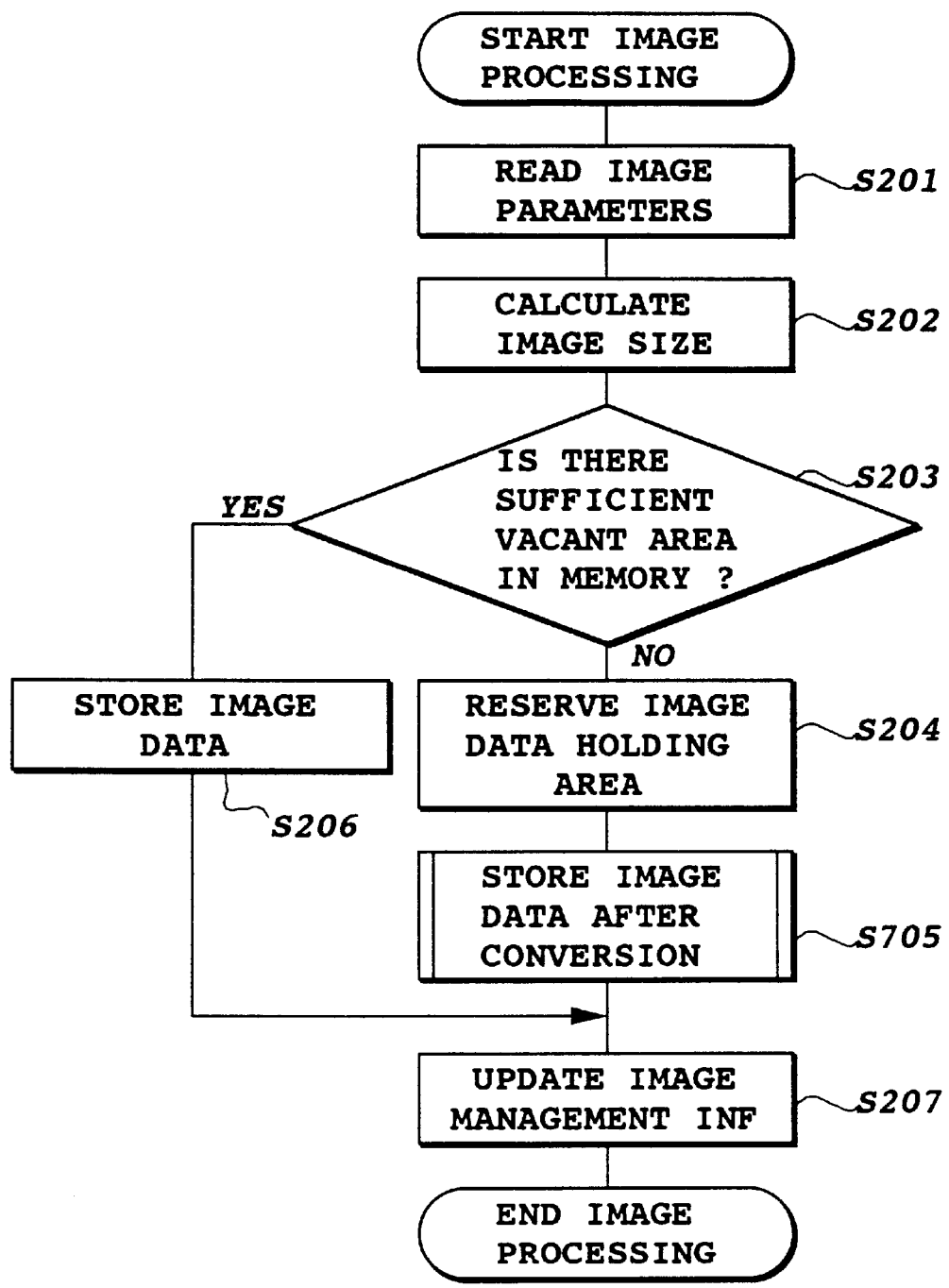
FIG. 7 is a flowchart of the image processing executed by CPU 3 of FIG. 6.

FIG. 7 is a flowchart of the input processing of the image data in the present embodiment. Since almost all the steps of FIG. 7 are the same as those of FIG. 2, their description is omitted. Only, a part of step S705 differs from step S205 of FIG. 2 as shown in FIG. 8.

Figure 8:
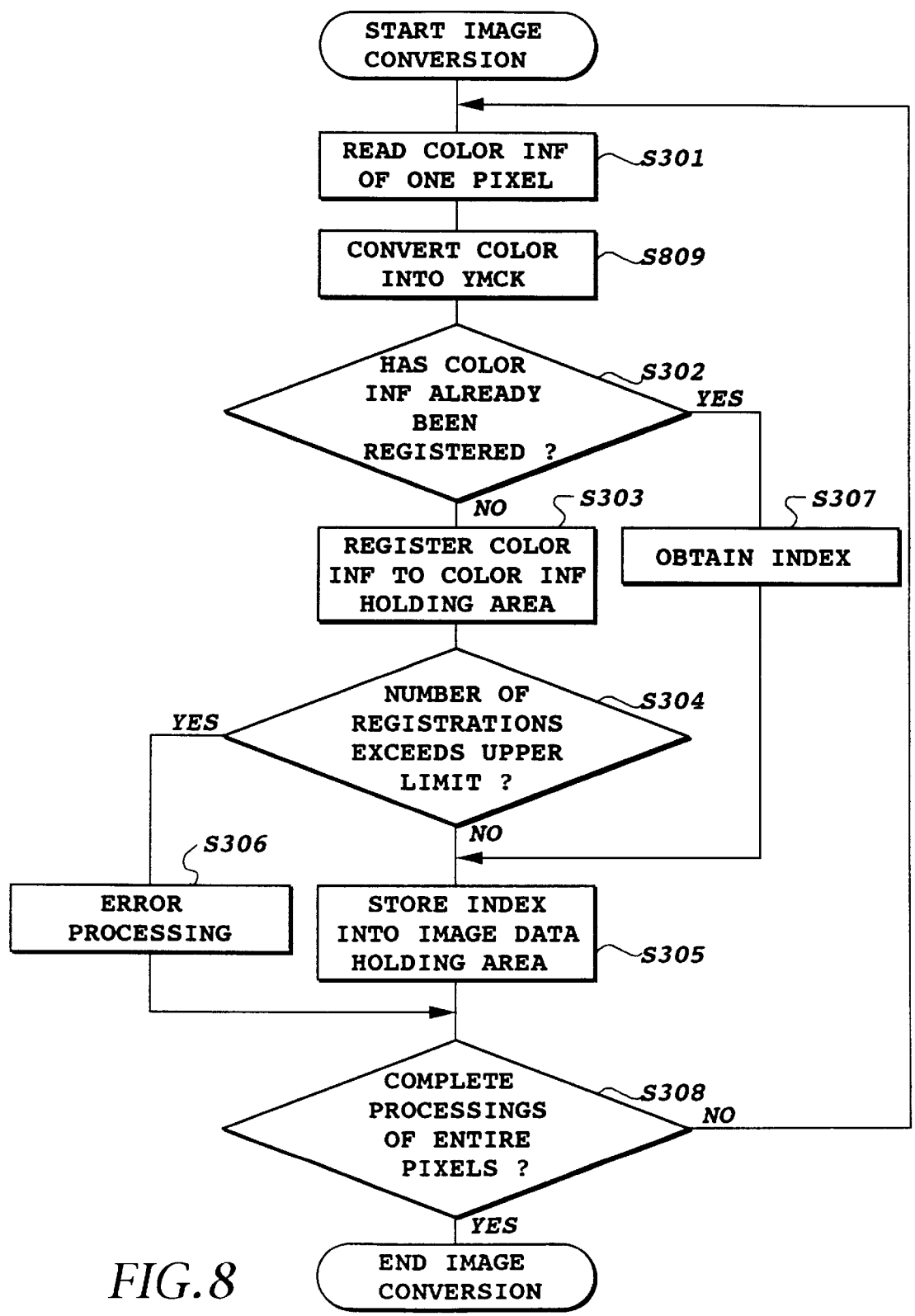
FIG. 8 is a flowchart of the image conversion and storing processing during the image processing executed by the CPU 3 of FIG. 6.

In FIG. 8, the RGB color information of the pixel at step S301 is converted into respective values of YMCK at step S809. The steps following step S809 are similar to those of FIG. 3, but they use the YMCK information obtained by the conversion at step S809 as the color information. Thus, the respective elements of the image data converted through this procedure indicate color information represented by YMCK.

As described above, according to this embodiment, the 24-bit YMCK values obtained by the color-conversion are stored as the color information, and image data are converted by using the 16-bit indexes referring to the 24-bit color information as shown in FIG. 9. This makes it possible to reduce the memory area needed to store the image data as in the first embodiment.

In addition, in the case where a plurality of RGB colors correspond to one piece of YMCK color information, the number of colors in the color information holding area 69 are reduced, thereby making it possible to shrink the size of the color information holding area 69.

The present invention is applied not only to a system which converts the input image data into a YMCK color system, but also to systems which convert the input image data into a YMC color system, a L*a*b* color system, and a L*u*v* color system.

EMBODIMENT 3

In the foregoing embodiments 1 and 2, the data length per pixel of the converted image data, that is, of the index is fixed at 16 bits.

In contrast, the data bit length of converted image data per pixel, that is, the bit length of the indexes in this embodiment is determined depending on the total number of colors stored in the color information holding area, that is, the total number of colors in the image data.

Figure 10:
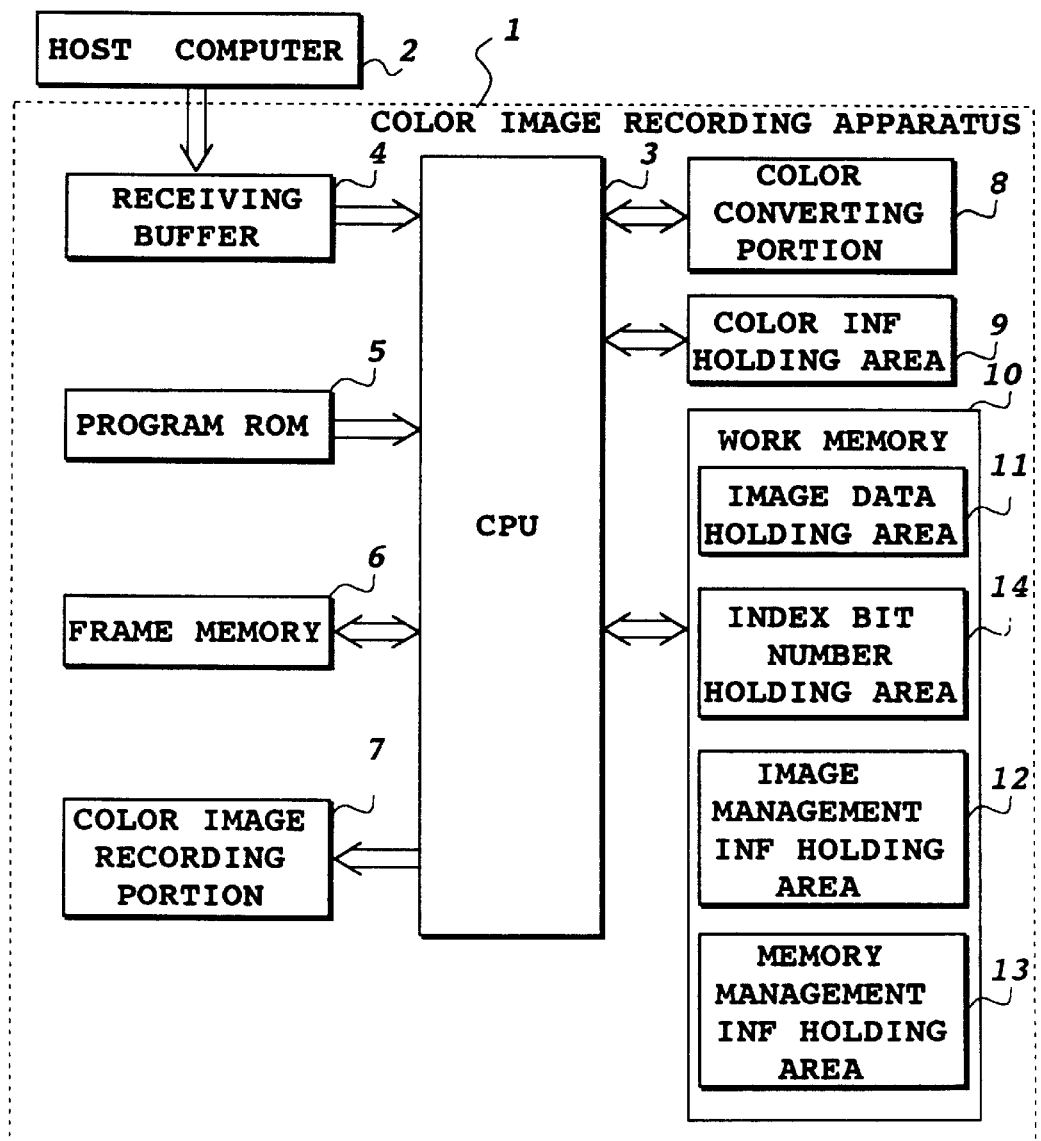
FIG. 10 is a block diagram of a third embodiment of a color image recording apparatus in accordance with the present invention.

FIG. 10 is a block diagram showing the third embodiment of a color image recording apparatus in accordance with the present invention. Since the color image recording apparatus shown in FIG. 10 is similar to that in FIG. 1, like portions are designated by the same reference numerals, and the description thereof is omitted. Only characteristic portions of this embodiment are described below.

In FIG. 10, the reference numeral 14 designates an index bit number holding area that holds the number of bits of each index per pixel of the image data consisting of indexes stored in the image data holding area 11. The index bit number is updated as the total number of colors held in the color information holding area 9 increases.

The image data input processing of the present embodiment will now be described with reference to FIGS. 11 and 12.

Figure 11:
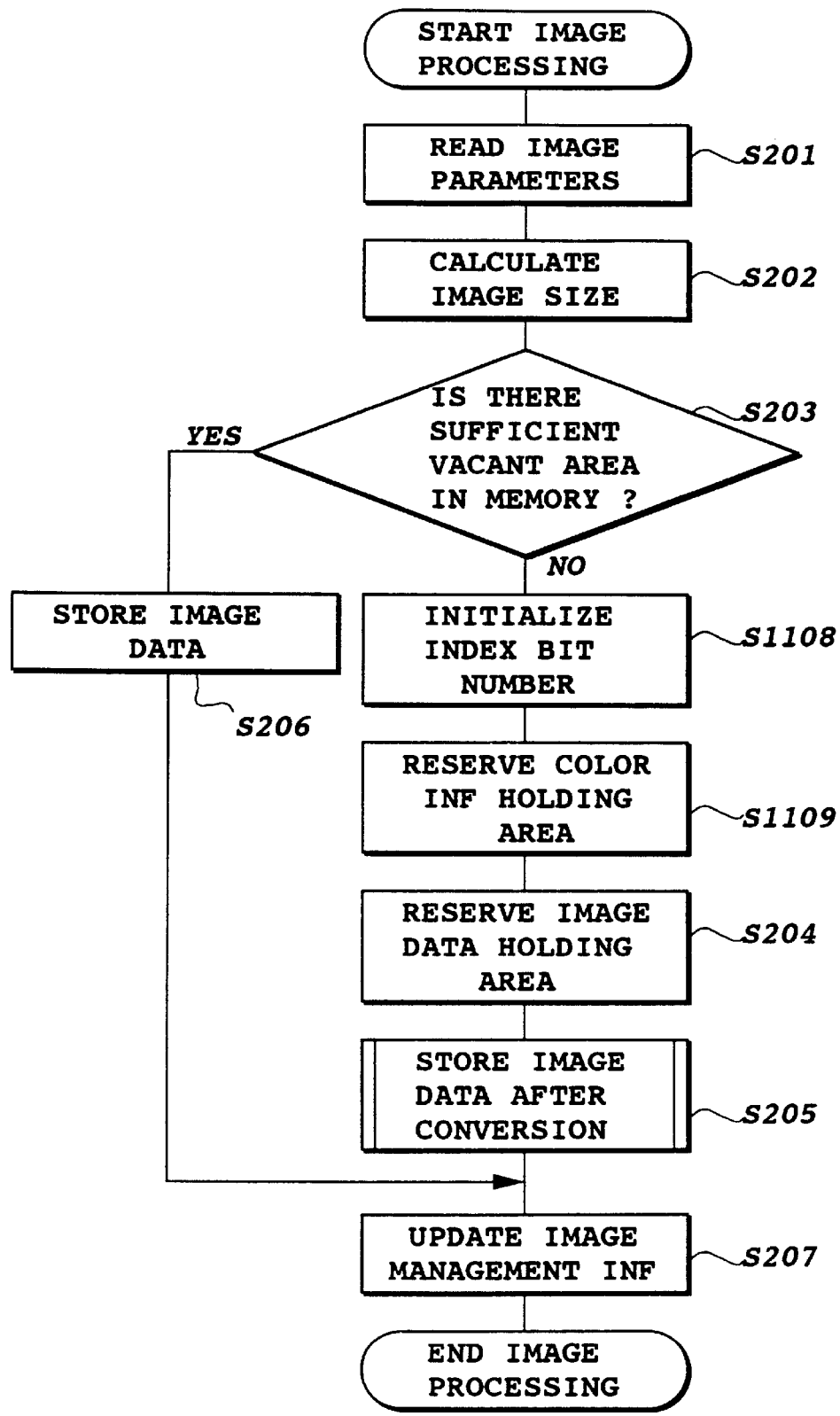
FIG. 11 is a flowchart of image processing executed by the CPU 3 of FIG. 10.

FIG. 11 is a flowchart of the procedure of the image data input processing in the present embodiment.

As in FIG. 2, from step S201 to S203, the size of an image is calculated, followed by the decision whether or not the image data can be stored in the memory without change. If it is possible, the image data is stored without change at step S206. If the memory capacity is insufficient, the image data is stored after the conversion beginning from step S1108.

At step S1108, the CPU 3 initializes the index bit number to its predetermined initial value of 1. Subsequently, at step S1109, the CPU 3 reserves the color information holding area for the image, and initializes the color information.

At step S204, the CPU 3 reserves the image data holding area 11. The size (the number of bytes) of the image data holding area to be reserved is calculated by the following equation.

area size=(the number of pixels in the width direction×the number of bits per pixel+7)/8×(the number of pixels in the height direction)

Then, the processing proceeds to step S205, in which the image data are converted into indexes, and the indexed are stored into the image data holding area 11.

Subsequently, the CPU 3 updates the image management information, and terminates the input processing of the image data. The processing is the same as that of FIG. 2.

Next, the conversion processing of the image data is described with reference to FIG. 12.

First, the CPU 3 reads color information of a pixel at step S301, and converts the RGB color information into the corresponding YMCK color information at step S809. Subsequently, the CPU 3 makes a decision whether or not the YMCK color information has been registered in the color information holding area 9 at step S302. When the initial pixel is processed, no data has been registered in the color information holding area 9. If the color information has not yet been registered, the color information is registered into the color information holding area 9 together with the corresponding index at step S303.

Then, the CPU makes decision whether the total number of colors exceeds an upper limit at step S304. The present upper limit is one obtained from the index bit number. For example, when the index bit number is one, the upper limit is two, and when the index bit number is two, the upper limit is four. Thus, the upper limit is calculated by the following expression:

upper limit=$2^{(index\ bit\ number)}$

When the number of registered items exceeds the upper limit, the CPU 3 expands the bit number at step S1210. For example, when the index bit number is one, it is expanded to two, when the index bit number is two, it is developed to four, when it is four, developed to eight, followed by expansions to 16, 24, etc.

In the expansion processing of the bit number at step S1201, the CPU 3 updates the index bit number and the image data which have been stored in the image data holding area 11 in accordance with the updated index bit number. That is, the CPU 3 makes equal the index bit number of individual pixels of the image data which have been stored in the image data holding area 11 to the updated index bit number. At the same time, the size of the image data holding area 11 is also updated.

Subsequently, the CPU 3 stores the index of the color information just registered into the image data holding area 11 at step S305. Then, the CPU 3 repeats the above procedures for all the pixels of the image.

If the CPU 3 makes decision that the color information of the present pixel of the image has already been registered, the CPU 3 obtains the index at step S307, and transfers to the processings at step S305 and forward.

Thus, the present embodiment holds the YMCK values after conversion as color information, and converts the image data into indexes corresponding to the color information, so that the bit length of the image data after conversion (that is, the index bit length) is sequentially increased from 1 bit to a least necessary bit length. This makes it possible to expect further reduction of the memory area for storing the image data as compared with the previous two embodiments wherein the image data are converted into a predetermined fixed bit length.

Although the index bit length is initialized to one in this embodiment, it may be started from four or eight. The present invention is not restricted by the initial bit length.

In the above-described embodiments, individual image data, which are expressed by PDL codes received from the host computer 2, are converted into indexes, and the individual image data expressed by the indexes are developed on the frame memory 6. Then, the developed data in the frame memory 6 is recorded by the color image recording portion 7.

As a variation of this, the input image data expressed by PDL codes may be handled in the following processes. First, the image data are converted into indexes. Subsequently, the CPU sequentially develops, into the work memory 10 instead of the frame memory, PDL codes included in the image, in the form of the indexes, thereby generating image data of the whole image in the work memory 10. Then, the color converting portion 8 generates binary YMCK data, and the color image recording portion 7 records the data using the frame memory as a buffer.

In addition, although the ink colors of the color image recording apparatus are the four of YMCK in the embodiments, the present invention is not restricted to this.

Moreover, although the input image data are color signals in the RGB color system, the present invention can also be applied to other color systems such as a Lab color system or a YIQ color system.

Furthermore, the present invention can be applied not only to a system consisting of a plurality of apparatuses, but also to a system consisting of a single apparatus.

In addition, the present invention can also be applied to a system or device achieving the above-described operations by software provided to the system or device.

The present invention has been described in detail with respect to various embodiments, and it is now apparent from the foregoing, to those skilled in the art, that changes and modifications may be made without departing from the invention in its broader aspects, and it is the intention, therefore, in the appended claims to cover all such changes and modifications as fall within the true spirit of the invention.

What is claimed is:

1. An image processing apparatus comprising:

input means for inputting color image data representing a color image;

storing means for storing the color image data;

decision means for making a decision whether or not the input color image data is written into said storing means, in a unit of color images; and creating means for creating a table representing a relationship between color image data and an index based on the color image, a bit length of the index being set based upon the color image;

converting means for converting the color image data into the index based on the table; and writing means for writing the image data into said storing means according to a decision result from said decision means, said writing means functioning in such a way that (i) when the decision is affirmative, the input color image data is written into said storing means, and (ii) when the decision is negative, the index is written into said storing means.

2. A color image processing apparatus as claimed in claim 1, wherein the second color system is formed of yellow, cyan, magenta and black color components.

3. The color image processing apparatus as claimed in claim 1, wherein said color system converting means converts said first color system into a third color system used in outputting an image at an image output portion.

4. A color image processing apparatus according to claim 1, wherein the color information is expressed in a Page Description Language.

5. A color image processing method comprising the steps of:

storing the color image data in a storage device;

making a decision whether or not the input color image data is written into the storage device, in a unit of color images; and inputting color information representing a color image;

creating a table representing a relationship between color image data and an index based on the color image, a bit length of the index being set based upon the color image; and writing the image data into the storage device according to a decision result obtained in said decision-making step, said writing step being performed in such a way that (i) when the decision is affirmative, the input color image data is written into the storage device, and (ii) when the decision is negative, the index is written into the storage device.

* * * * *

UNITED STATES PATENT AND TRADEMARK OFFICE
CERTIFICATE OF CORRECTION

PATENT NO.   : 6,088,124
DATED        : July 11, 2000
INVENTOR(S)  : FUMIHIRO TANAKA It is certified that error appears in the above-identified patent and that said Letters Patent is hereby corrected as shown below:

ON THE TITLE PAGE

Insert --[30] Foreign Application Priority Data
        Apr. 18, 1994 [JP] Japan .....6-79055--.

IN THE DRAWINGS

Figure 12:
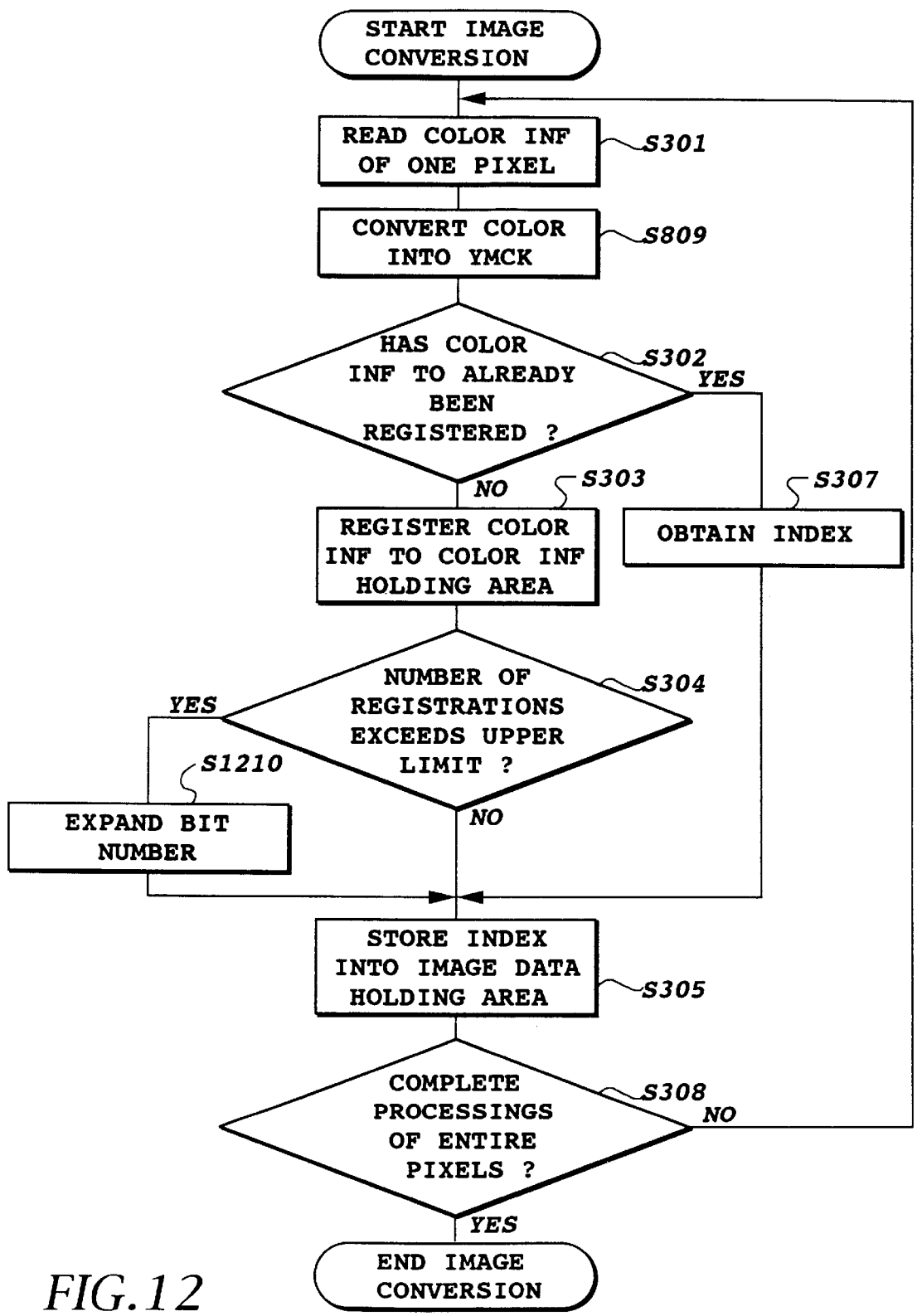
FIG. 12 is a flowchart of image conversion and storing processing during the image processing executed by the CPU 3 of FIG. 10.

Sheet 12 Fig. 12, in block S302, delete "TO".

COLUMN 4

Line 22, "below" should read --below with--.

COLUMN 6

Line 10, "is" should read --are--; and
    Line 45, "an" should read --as--.

UNITED STATES PATENT AND TRADEMARK OFFICE
CERTIFICATE OF CORRECTION

PATENT NO.    : 6,088,124
DATED         : July 11, 2000
INVENTOR(S)   : FUMIHIRO TANAKA It is certified that error appears in the above-identified patent and that said Letters Patent is hereby corrected as shown below:

COLUMN 9

Line 12, "indexed" should read --indexes--;
    Line 30, "decision" should read --a decision--; and
    Line 62, "processings" should read --processing--.

Signed and Sealed this

Twenty-second Day of May, 2001

Attest:

NICHOLAS P. GODICI

Attesting Officer     Acting Director of the United States Patent and Trademark Office